United States Patent [19]

Schumperli

[11] 3,843,844

[45] Oct. 22, 1974

[54] SUBSCRIBER LOOP CIRCUIT APPARATUS

[75] Inventor: Albert Schumperli, Guelph, Ontario, Canada

[73] Assignee: International Standard Electric Corporation, New York, N.Y.

[22] Filed: Feb. 11, 1972

[21] Appl. No.: 225,398

[30] Foreign Application Priority Data

June 4, 1971 Canada .............................. 114862

[52] U.S. Cl. .............................................. 179/16 F
[51] Int. Cl. ........................ H04m 1/76, H04q 1/30
[58] Field of Search ........... 179/16 E, 16 EA, 16 F

[56] References Cited

UNITED STATES PATENTS

| | | | |
|---|---|---|---|
| 3,166,642 | 1/1965 | Abbott | 179/16 E |
| 3,522,384 | 7/1970 | Ricketts et al. | 179/16 F |
| 3,639,696 | 2/1972 | Chambers, Jr. | 179/16 F |
| 3,660,609 | 5/1972 | Tremblay et al. | 179/16 F |
| 3,671,676 | 6/1972 | Henry et al. | 179/16 F |
| 3,689,700 | 9/1972 | Lent | 179/16 F |
| 3,689,704 | 9/1972 | Wadding | 179/16 F |
| 3,739,099 | 6/1973 | Fitzsimons et al. | 179/16 F |
| 3,746,795 | 7/1973 | Fitzsimons et al. | 179/16 F |
| 3,781,480 | 12/1973 | Roge | 179/16 F |

OTHER PUBLICATIONS

F. T. Andrews, Jr., "Customer Lines Go Electronic;" Bell Labs Record, Vol. 50, No. 2, February 1972, pages 59–65.

*Primary Examiner*—Kathleen H. Claffy
*Assistant Examiner*—Randall P. Myers
*Attorney, Agent, or Firm*—James B. Raden; Marvin M. Chaban

[57] ABSTRACT

Circuit apparatus is provided for extending the allowable distance between the subscriber's loop and the central office. To provide this feature, the circuits sense a subscriber loop line closure to add an increased voltage for the conversation path and improved supervisory signalling. With the increased voltage, the current to the subscriber's conversation path is maintained at a constant level. Further additional circuits such as a bidirectional voice frequency repeater, pulse correction circuits, and supervisory control circuits operative at the increased voltage may be connected into the conversation path. With reverse battery signalling, the polarity is sensed to activate the current regulation. On a call to the subscriber loop, the ringing signals are bypassed until the call is answered.

3 Claims, 7 Drawing Figures

SUBSCRIBER LOOP CIRCUIT APPARATUS

CROSS REFERENCE TO REPEATED APPLICATION

Reference is made herein to copending application Ser. No. 149,934 filed in the U.S. Patent Office on June 4, 1971 by Alan Stewart and assigned to the assignee herein, for Voice Frequency Repeater.

BACKGROUND OF THE INVENTION

In recent years, a great many devices have been sold to extend the range of effectiveness of subscriber loop circuits for both signalling circuits and voice transmission circuits. The need for such circuits has arisen due to the attenuation of the transmitted signal level in lines having high resistance due to the distance of the subscriber from the central office. For voice circuits, a number of repeater circuits have been developed, sold and used. Various booster power devices such as Range or Loop Extenders or Adapters have also been developed, produced and sold providing individual circuits providing one or some of the desired signalling and supervisory functions.

Operating companies have applied certain objectives which must be met such as: limitation of the total loss to the farthest subscriber to 7.5 db at 1 kHz. A limitation of 5 db has been found to be approximately as much as can be introduced without inacceptable distortion. Further current requirements of approximately 23 ma should be provided to maintain acceptable conversation levels.

DESCRIPTION OF THE PRIOR ART

Many of the circuits provided by the prior art have included 5 db gain units for transmission, range extenders for increased voltage, pulsing and talking and modified switching equipment circuits. For example, U.S. Pat. No. 3,531,598 issued on Sept. 29, 1970 to McNair of the Bell Telephone Laboratories shows polarity sensing circuit for the insertion of an additional voltage on high resistance telephone lines.

The circuits heretofore have had one or more of the following technical disadvantages. On short distances from the central office, load coils had to be removed, while on lines at a long distance from the office load coils had to be inserted. Circuits were designed primarily for use on one and two party lines only and could not readily be used for PBX lines, key system lines or multi-party lines. Gain of no more than 5 db could be provided. Frequently, the final distance to the office required wire of a particular guage for a predetermined distance.

SUMMARY OF THE INVENTION

The present invention provides a circuit having the following features: (1) Detects the loop condition as open or closed; (2) Provides pulse correction during dialling, if desired; (3) Detects and transmits ringing signals; (4) Trips the ring on the called line going off-hook; (5) Senses reverse battery (if this type of signalling is used) and reverses connections accordingly; (6) Provides talking current at a predetermined level sufficient to maintain conversation levels and maintain that current level; and (7) Senses short or long distances to the calling subscriber to switch into the talking path a voice frequency repeater or gain unit.

In providing these features, the present invention will operate in the presence or absence of load coils, permits the insertion of gain of above 5 db to the talking path; is otherwise insensitive.

The circuits shown extend the dialling and signalling distance of central office equipment with boosted supervision voltage, repeated pulsing, extended or repeated ringing, ring-trip and subscriber supervision on two-wire private and party lines. The units may also be used as intermediate signalling repeaters or may be used with a VF repeater. The units can serve several lines, independent of their length, when placed at concentrated path in a central office in a common mode application.

The circuits shown include capacitor/current regulator bridge to replace the transformer and pulsing relays used in similar units. Besides providing constant current for all line conditions the unit provides additional protection for the equipment on the central office side. The central office is decoupled (for dc) from the subscriber by coupling capacitors. The unit provides a low insertion loss since the regulator offers a high impedance to voice frequencies, and ringing voltages are applied through the unit with straight-through connections.

It is therefore an object of the present invention to provide new and improved subscriber loop circuits for extending the range thereof.

It is a further object of the invention to provide an improved loop range extender including a plurality of signalling and supervisory circuits.

It is a further object of the invention to provide a circuit which is applicable to individual subscriber lines or with a minimum of change can be applied for common mode operation.

It is a still further object of the invention to provide a circuit which senses the length of the distance to the subscriber's station and which switches in various line extenders when the distance is above a predetermined one.

These and other objects, features and advantages of the invention will become apparent from the following specification viewed with the drawings as next described briefly.

DETAILED DESCRIPTION

Figure 1:
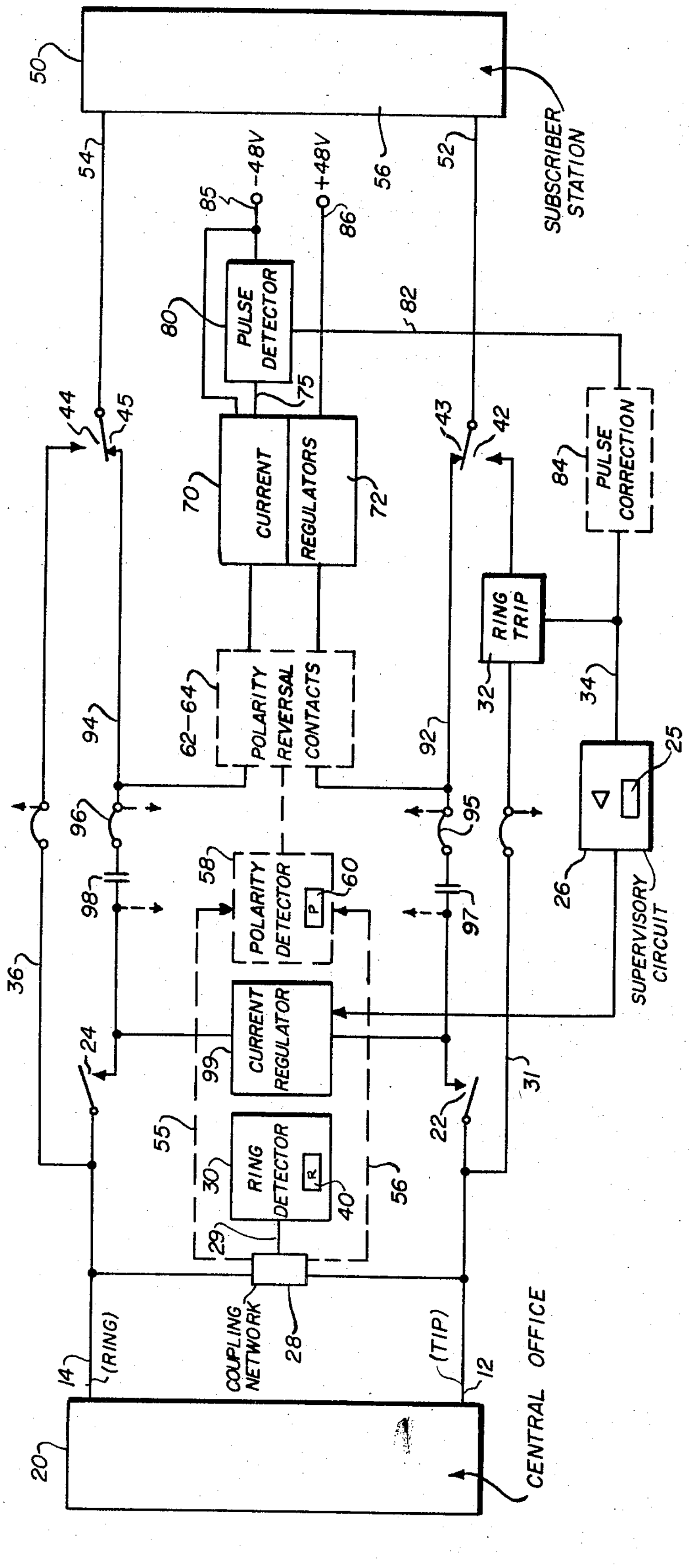
FIG. 1 is a schematic block diagram of the circuit for the apparatus of the present invention.

Turning to FIG. 1, there I show a schematic block diagram of circuit apparatus for my subscriber loop apparatus. I show the conductors 12 and 14 representing respectively the tip and ring conductors extending between the present apparatus and to the central office, indicated by the box numbered 20.

Leads or conductors 12 and 14 are each connected to respective make contacts 22 and 24 respectively, of a relay 25 in supervision circuit 26, which responds to the off hook condition of the called subscriber as will be explained in detail. Connected across leads 12 and 14 is a coupling circuit 28. Circuit 28 is also connected over lead 29 to the ring detector 30. Ring detector 30 includes a detector relay 40 which operates to connect the subscriber's line directly to the central office, as will be described. A further path from the central office over lead 12 bypasses contacts 22 by way of lead 31 to the ring trip circuit 32. Ring trip circuit 32 is operative to sense closure at the subscriber's line and over lead 34 and close the circuit to off hook sensing relay 25.

Figure 2A:
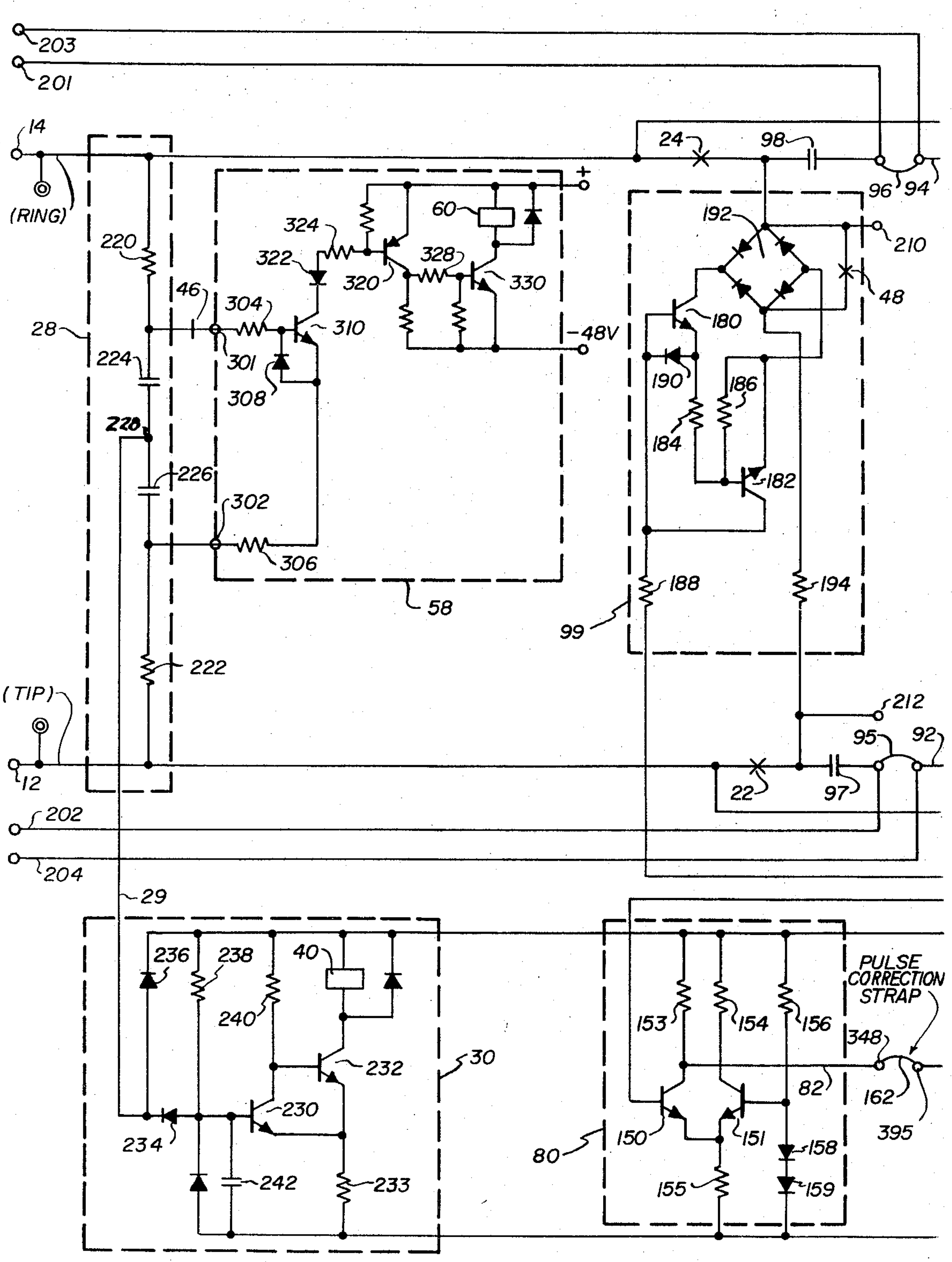
FIGS. 2*a* and 2*b* are joined to show in greater detail the circuits of the apparatus of FIG. 1.

Lead 14 is connected to a bypass of contacts 24 over lead 36 leading to normally open contact set 44 of relay 40. The armature contactor 45 of this contact set is connected to the ring conductor 54 at the subscriber station 50 to which the apparatus of FIG. 1 is connected. A similar contact set 42 of relay 40 has its armature contactor 43 connected to tip conductor 52 at subscriber station 50. The normally open contact of set 42 is connected to lead 55 leading to the ring trip circuit 32. Contact sets 42, 44, normally closed contacts 46 and contacts 48 (both shown in FIG. 2*a*) are controlled by relay 40 within ring detector 30. Relay 40 operates when ringing current is received by the apparatus to switch contact sets 42 and 44 and complete a straight-through ringing path to the subscriber station over conductor 54, and to connect the ring trip circuit to subscriber conductor 52.

The coupling network 28 also may feed an optional polarity detector 58 (usable where necessary) which includes a polarity transfer relay 60. The relay 60 in FIG. 1 indicated by the dashed line box controls its contacts 62 and 64. The contacts 62 and 64 control the polarity reversal to the subscriber station constant current regulators 70 and 72, there being a separate regulator for each of the subscriber conductors 52 and 54. Regulators 70 and 72 impose a high impedance to voice frequencies, hence low insertion loss. The current regulator 70 controls the connection to the −48 volt source at terminal 85, through pulse detector 80, and over a lead 75 to regulator 70. The pulse detector 80 also has a connection over lead 82 to the optional pulse correction circuit 84. Regulator 72 controls the connection to the +48 volt source at conductor terminal 86.

The respective line or talk path leads 92 and 94 intermediate between contacts 22 and 42 for the tip path (12–52), and for the ring path (14–54) contacts 24 and 44, each has its respective optional connection strap 95 and 96 and coupling capacitor 97 and 98 used to provide a direct talking path in the absence of a voice frequency repeater. When a voice frequency repeater is to be used, the straps are cut on both sides of the capacitors and connection is made to the repeater (not shown in FIGS. 1 or 2) at the arrowed leads, as will be explained in connection with FIGS. 4 and 5.

A further current regulator 99 is connected across talk path leads 92 and 94 to provide a constant current reference for the connection to the central office. Regulator 99 is similar in its operation of regulators 70 and 72.

The operation of the apparatus of FIG. 1 will now be described. On an incoming call from the central office 20, ringing current is transmitted through coupling network 28 to activate the ring detector 30. The ring detector relay 40 in detector circuit 30 is operated to switch its contacts 42, 44, 46 and 48, and apply ringing current over the through-connection to subscriber tip and ring leads 52 and 54. If the subscriber answers during a ringing period, the ring trip circuit 32 energizes relay 25 in supervisory circuit 26 over conductor 34.

Relay 25 on being energized closes its contact sets 22 and 24. Current regulator 99 is activated over further contact 48 of relay 40 to provide current for the dc loop to central office 20, responsive to tripping of the ringing. Increased voltage from sources at terminals 85 and 86 is applied to the subscriber via current regulators 70 and 72 to provide a constant current to the talking leads of the subscriber telephone set. If the subscriber answers during a silent period, the boosted battery voltage is immediately applied to the subscriber and pulse detector circuit 80 activates relay terminal 25 in the supervision circuit 26. Capacitors 97 and 98 thereafter couple the central office to the subscriber for voice frequencies, while the current regulators offer a high impedance to voice frequencies. The capacitors 97 and 98 may be strapped out when the unit is used with a VF repeater, as previously mentioned.

On a call from the subscriber to the central office, dial pulses from the subscriber are detected in the pulse detector circuit 80 and applied to the central office via the pulse correction circuit 84 if used, and a path through the supervision circuit 26 and current regulator 99. The make-break ratio of the dial pulses can be adjusted with the optional pulse correction circuit. The polarity detector circuit transfers battery reversals on the central office line to the subscriber line, where this feature is used.

Figure 2:
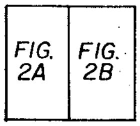
FIG. 2 is a miniature block diagram indicating how
Figure 2B:
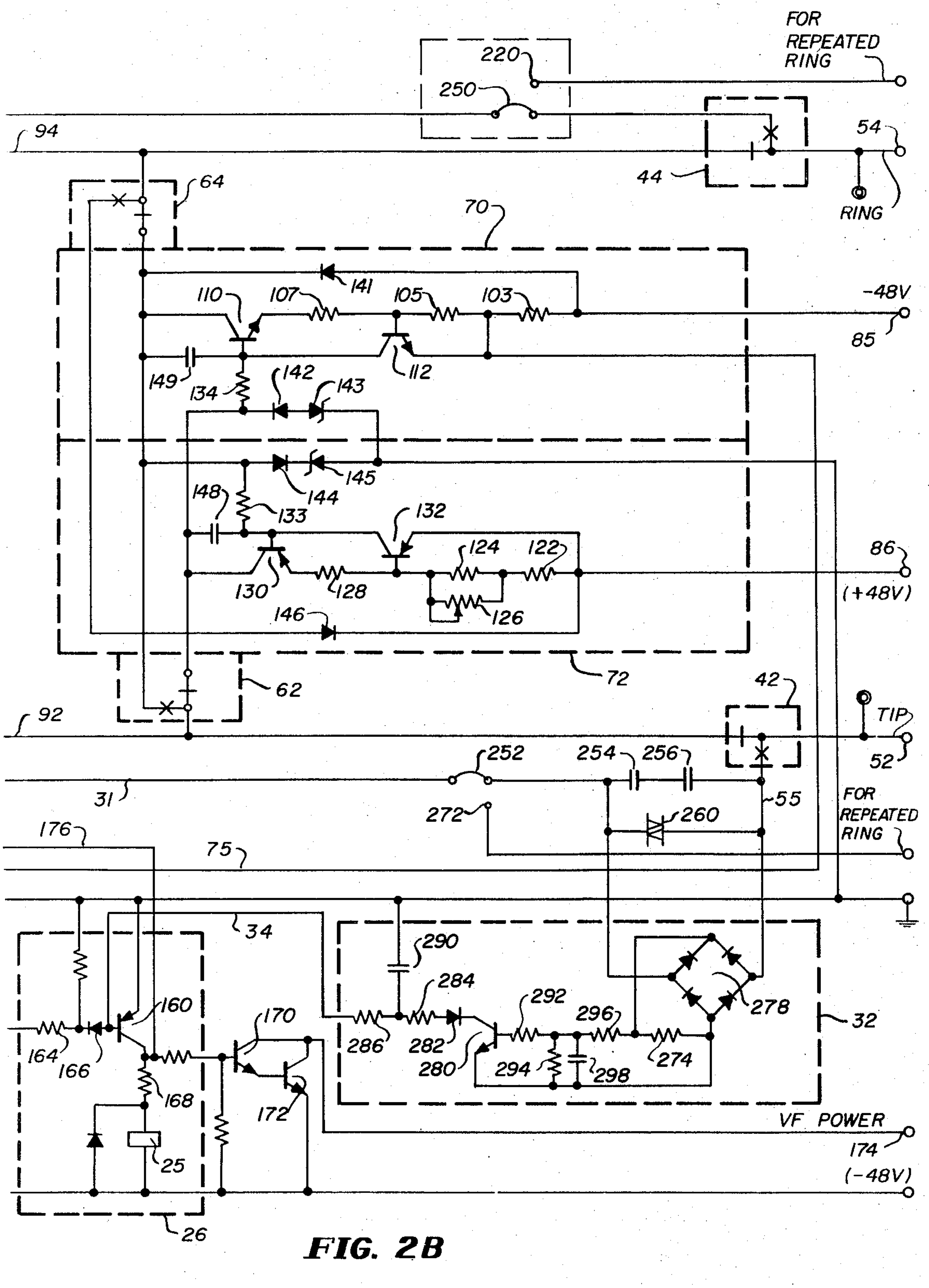

In FIG. 2, I show the circuits of FIG. 1 in greater detail. There I show the regulators 70 and 72 which operate as follows: negative voltage is applied to the subscriber's R lead 54 from the negative terminal 85, through resistors 103, 105 and 107 and transistor 110 (in regulator 70) and break contacts 64 and 44. Any increase in current through resistor 105 increases the collector current at transistor 112, shunting the base current of transistor 110. As a result, the emitter-collector voltage of transistor 110 increases and the collector current of transistor 110 drops to its previous value. Positive voltage is applied to the subscriber T lead 52 via source terminal 86, resistors 122, 124, 126 and 128, transistor 130 (in regulator 72) and break contacts 62 and 42. Transistors 130 and 132 form current regulator 72 which operates in the same manner as the regulator 70. To achieve a high longitudinal balance of the line, potentiometer 126 is adjusted to provide equal voltage drops across both current regulators. Regulator transistors 110 and 130 are biased by resistors 134 and 133 respectively, (complementary regulator outputs) to achieve stability for variations in temperature and component characteristics. Resistors 107 and 128 act as bias resistors. Diodes 141 through 146 protect the regulators from high voltage spikes, and capacitors 148 and 149 prevent high frequency oscillations.

CALL FROM THE SUBSCRIBER

When the subscriber at station 50 goes off hook, the closed dc loop across terminals 52 and 54 produces a voltage drop across resistor 103 in regulator 70. This voltage drop increases the base voltage of transistor 150 in pulse detector 80 by way of lead 75. The pulse detector circuit 80 is a differential amplifier including transistors 150 and 151, resistors 153 – 156, and diodes 158 and 159. In its idle condition, transistor 151 is forward-biased through resistor 156. Diodes 158 and 159 set the normal threshold level for transistor 150. When this threshold is exceeded by the increased voltage resulting from the off hook condition, transistor 150 conducts. Negative voltage is applied to the base of transistor 160 via resistor 155, the emitter-collector junction of transistor 150, strap 162, resistor 164 and decoupling diode 166. Transistor 160 conducts and energizes relay 25 via resistor 168 to prevent ringing. Relay 25 on energization switches its contacts 22 and 24. The central office line conductors 12 and 14 are now connected to capacitors 97 and 98 respectively, by make contacts 22 and 24. When transistor 160 is conducting, it forward-biases transistors 170 and 172, applying (−48 vdc) power to terminal 174 to provide power for voice frequency repeater, if used.

Ground potential from the collector of transistor 160 is connected over lead 176 to current regulator 99 to operate this regulator. Regulator 99 includes transistors 180, 182, resistors 184, 186 and 188, and diode 190. Operation of this regulator 99 is similar to that of the two current regulators 70 and 72 on the subscriber station side and provides further current regulation.

When the subscriber dials, transistor 160 pulses relay 25 and switches the current regulator 99 on and off, repeating the pulses to the central office. Diode 190 in regulator 99 provides protection for the regulator circuit against high voltage peaks generated by stepping relays in the central office. The receiver bridge circuit 192 ensures that the regulator circuit 99 operates regardless of the polarity applied at central office terminal conductors 12 and 14. Resistor 194 is used to limit the power dissipation of transistor 180 when the unit is used as a terminal repeater (no line voltage drop between the central office and the apparatus). Resistor 194 may be shorted out when the line distance between the central office and the apparatus unit is long. Relay contacts 48 of relay 40 in ring detector 30 short out the current regulator to give a fast ring trip when ringing voltage is applied at office conductors 12 and 14, and relay 25 has been energized due to the subscriber going off hook.

With relay 25 energized there is a straight-through connection for voice frequencies from conductor 14 to subscriber conductor 54 via make contact 24, capacitor 98, strap 96, and break contact 44, and from conductor 12 to conductor 52 via make contact 22, capacitor 97, strap 95 and break contact 42. When a VF repeater is connected across terminals 201 and 202 and 203 and 204, straps 95 and 96 are removed to open the capacitor bridge. For some VF repeaters, the removed strapping 96 may be connected to terminal 210 and 95 is connected to terminal 212.

Resistors 220 and 222 and capacitors 224 and 226 form the coupling network 28 positioned across the central office line and connected at its midpoint 228 to the ring detector which includes transistors 230 and 232, relay 40, and their associated components. The function of the ring detector will be described in the following section.

CALLS TO THE SUBSCRIBER

Ringing voltage (20–50 Hz) applied from the central office to leads 12 and 14 is coupled through coupling network 28 over lead 29 to the cathode of diode 234 and the anode of diode 236. The ringing voltage forward-biases diode 236 on positive half-cycles to short positive half-cycles to ground. Transistors 230 and 232 with common emitter resistor 233 form a Schmitt trigger. In the idle condition transistor 230 is forward-biased via resistor 238. The ringing current forward-biases transistor 232 via resistor 240 to energize relay 40. Negative half-cycles of ringing current also discharge capacitor 242, which was charged during the positive half-cycles via resistor 238, to keep transistor 230 cut off. Ringing current is applied to the subscriber line conductor 54 via lead 14, strap 250 and make contact 44, and to lead 52 via lead 12, strap 252, capacitors 254 and 256, and make contact 42. Varistor 260 connected in parallel with capacitor 254 and 256 provides protection for the ring trip circuit. To provide repeated ringing, straps 250 and 252 are removed and straps to terminal 270 and 272 are inserted for connection to a repeated ring circuit, not shown herein.

When the subscriber answers a call during a ringing period, a small dc current with the superimposed ring current flows through the bridge rectifier circuit 278 in ring trip circuit 32. This current flow produces a voltage drop across resistor 274, which forward-biases transistor 280 in the ring-trip circuit. The polarity of the voltage drop across resistor 274 is the same regardless of the direction of the current flow in the loop in view of its connection to the rectifier bridge 278, and thereby provides a constant bias polarity to transistor 280. When transistor 280 conducts, it forward-biases transistor 160 during negative ring cycles, via decoupling diode 282 and resistors 284 and 286 and lead 34. When transistor 160 conducts, it closes the dc loop to the central office, as explained previously. During positive ring cycles, diode 282 is reverse-biased and capacitor 290 discharges keeping transistor 260 forward-biased. Resistors 292, 294, 296 and capacitor 298 form a delay circuit to prevent false ring trip due to switching transients.

POLARITY REVERSAL

Where polarity reversal is used to indicate a closed loop (off hook condition) from the central office, the polarity of voltage at leads 12 and 14 from the central office is sensed so that the increased voltage (booster battery) can be connected to conductors 52 and 54 at the subscriber's station.

The polarity reversal is sensed or detected in the following manner:

The line voltage from the central office on lead 14 is applied to the polarity detector circuit 58 via resistor 220 and break contact set 46 to terminal 301, one input to the polarity detector 58. The connection from the other terminal lead 12 can be traced through resistor 222 directly to terminal 302 at the other input lead to polarity detector 58. Resistors 304 and 306 provide a high input resistance and the polarity detector circuit will only draw a small current from the line. Diode 308 is forward-biased when the polarity at lead 14 is negative with respect to terminal lead 12, and transistor 310 is cut off. When the voltage at terminal lead 14 is positive with respect to terminal lead 12, diode 308 is reverse-biased and transistor 310 conducts. Transistor 310 on conduction forward-biases transistor 320 via decoupling diode 322 and resistor 324. Ground potential is applied to the base of transistor 330 via the emitter-collector junction of transistor 320 and resistor 328. Transistor 330 conducts and energizes polarity switching relay 60. The negative voltage from the collector of transistor 110 (in regulator 70) is switched to the tip lead 52 of the subscriber line via make contact 62, and break contact 42; the positive voltage from the collector of transistor 130 is switched to the ring lead 54 of the subscriber line via make contact 64, and break contact set 44.

PULSE CORRECTION

Figure 3:
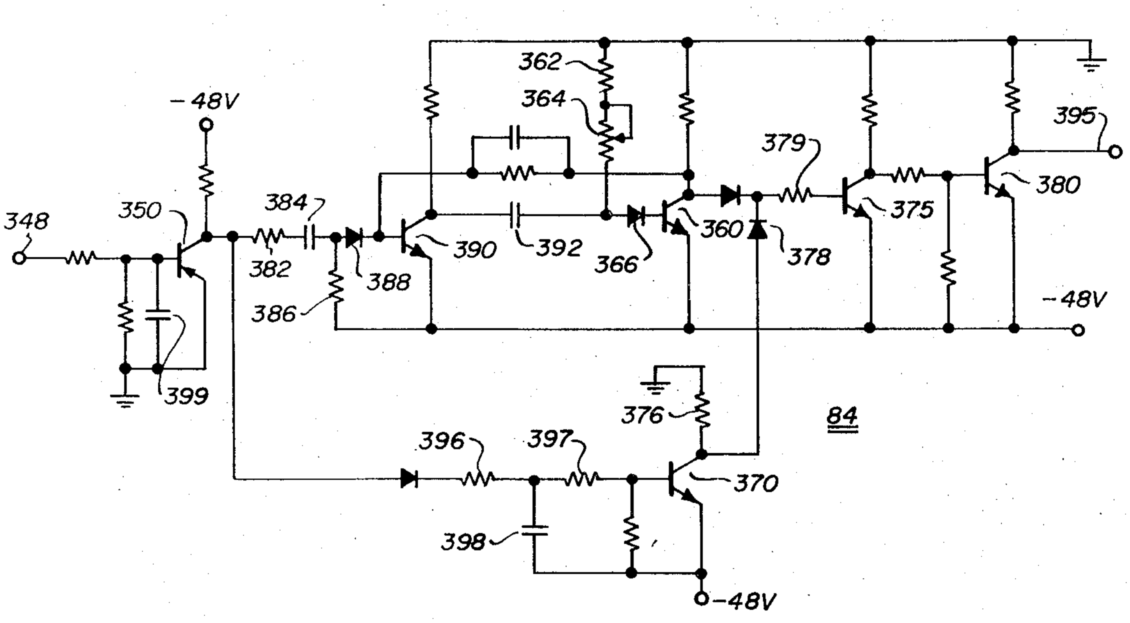
FIG. 3 is a schematic circuit diagram of the Pulse Correction Circuit shown in FIG. 1.

When the optional pulse correction circuit 84 of FIG. 3 is connected in the signalling unit in place of strap 162 (in FIG. 2*a*), the break-make ratio of pulses from the subscriber to the central office can be adjusted automatically. The pulse correction circuit is basically a monostable multivibrator and a bypass circuit for the on hook and off hook conditions.

In the idle condition, ground potential, via resistor 153 (FIG. 2*a*), is applied to the input terminal 348, and trasistor 350 is cut off. The multivibrator output transistor 360 is forward-biased by resistors 362 and 364 and diode 366. Bypass circuit transistor 370 is reverse-biased and ground potential is applied to the base of transistor 375 via resistor 376, diode 378 and resistor 379. Transistor 375 conducts and keeps 380 cut off.

When the subscriber goes off hook, the negative potential is applied to terminal 348 through conducting transistor 150 to forward-bias transistor 350, which causes transistors 350 and 370 to conduct. When transistor 350 conducts, the differentiator consisting of resistor 382, capacitor 384, resistor 386, and diode 388 will trigger the multivibrator. Transistor 390 conducts and causes transistor 360 to cut off until capacitor 392 discharges via resistors 364 and 362. As long as transistor 360 remains cut off, transistor 375 conducts and transistor 380 is cut off. When capacitor 392 discharges, transistor 360 conducts, to cut off transistor 375 and causes 380 to conduct and apply the negative voltage to terminal 395.

Ground potential (corresponding to the dial pulses) at the collector of transistor 350 triggers the multivibrator producing a pulse, and the pulse length may be set by adjusting the slides of potentiometer resistor 364. Resistors 396 and 397 with capacitor 398 form a delay circuit so that transistor 370 will not follow the dial pulses. Capacitor 399 prevents transients from switching the monostable circuit.

COMMON MODE APPLICATION

Figure 4:
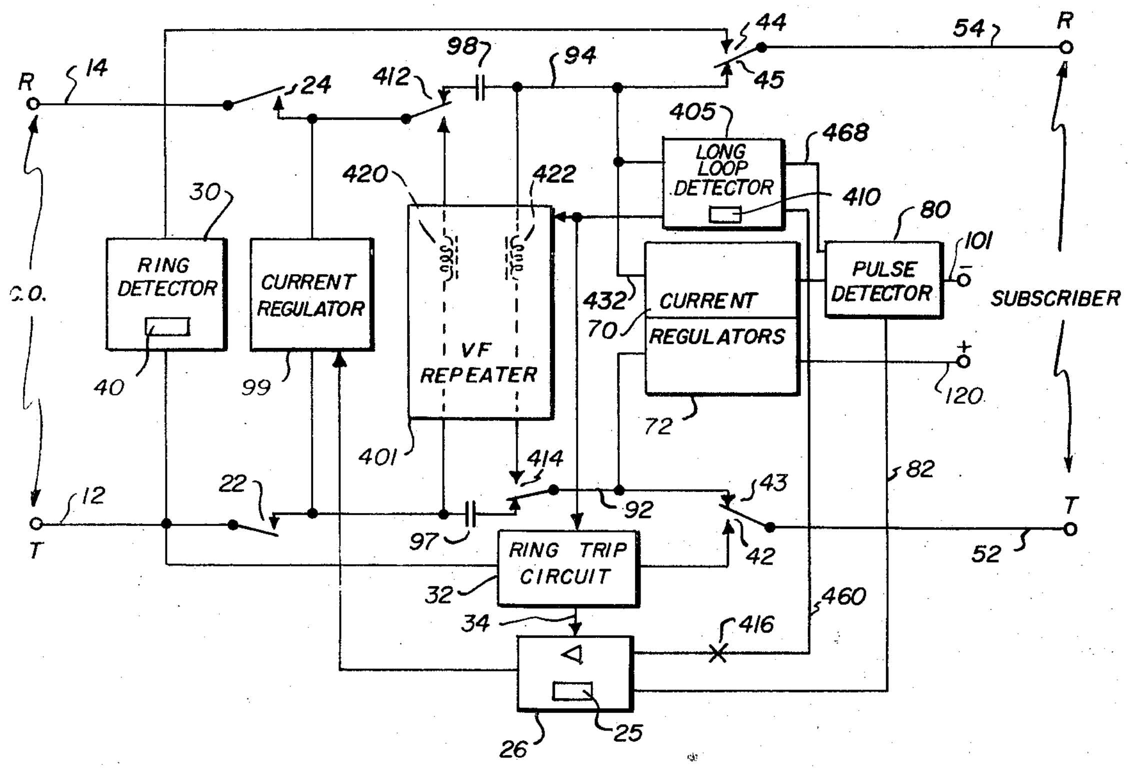
FIG. 4 is an alternate schematic block diagram of the circuit for the apparatus as usable in common mode operation.

FIG. 4 shows in block diagram a further embodiment of the invention which permits the use of one signalling unit as shown in FIGS. 1 and 2 for several lines, independent of the line length. The unit of FIG. 4 is connected into a concentrated path in the central office and a loop length detector 405 switches a gain unit or voice frequency repeater 401 into the system when a line requires VF amplification. To provide this feature, I break the strap 95 (FIG. 2*a*) and make the connection of the gain unit 401 to conductors 92 and 94, as shown in FIG. 4.

In detector 405, I employ a relay 410 with contacts 412 and 414 switchable from their normal position closing direct paths to capacitors 98 and 97 to operated positions connecting the gain unit 401 to the line.

I use the principle of sensing the voltage at the outputs of the current regulators 70 and 72 on the subscriber side to give an indication of the line length (high voltage across the regulators for a short loop; low voltage across the regulators for a long loop).

For a short loop, relay 410 is not energized and voice frequency paths are connected directly through the unit of FIG. 4. Relay 410 controls three sets of contacts of which contacts 412 and 414 normally close the line path and switch to connect the gain unit and contacts 416, normally open or break contacts. Terminal lead 14 (ring) leading to the central office is connected to terminal lead 54 (ring) of the subscriber line via make contact 24, break contact set 412, capacitor 98, and break contact set 44. Terminal lead 12 (tip) is connected to subscriber terminal lead 52 via make contact 22, capacitor 97, break contact 414 of relay 410, and break contact 42. When a long loop is sensed, long loop relay 410 is energized and connects the central office line to one transformer 420 of the VF repeater. As mentioned previously, the gain unit or VF repeater 401 usable herein may be that one which forms the basis of the copending Stewart application referred to previously.

Figure 5:
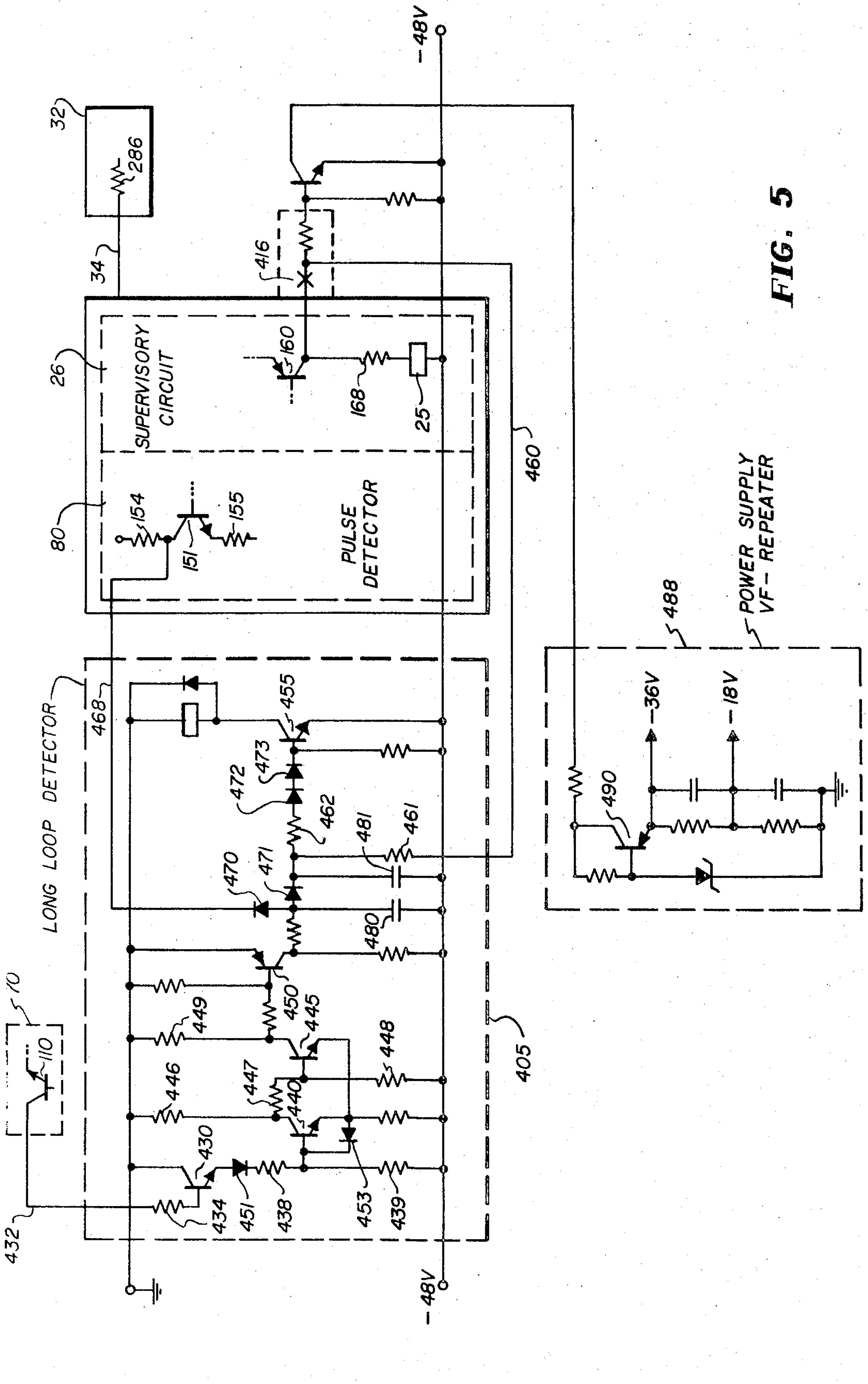
FIG. 5 is the detailed circuit diagram of the additional apparatus of FIG. 4, which has not been shown heretofore.

In FIG. 5, I show in greater detail the circuits of FIG. 4 not shown previously, and their interconnection to the system. The voltage required for the long loop detector is obtained from the collector of transistor 110 in regulator 70 over lead 432. This voltage is applied to the base of the transistor 430 of the long loop detector via resistor 434. The emitter-follower configuration of transistor 430 provides a high imput impedance to the long loop detector circuit. A voltage divider, including resistors 438 and 439, may be adjusted so that the long loop detector switches at desired talking path voltages and in response to different line lengths. The voltage divider output is applied to a Schmitt trigger circuit including transistors 440 and 445 and their bias and coupling resistors 446, 447, 448 and 449. Diodes 451 and 453 protect transistors 430 and 440 against reverse voltages. On a call from a short loop length line, the collector-emitter voltage of regulator transistor 110 exceeds the threshold voltage of transistor 440 causing this transistor to conduct. Conduction of this transistor maintains transistor 445 conductive maintaining the trigger circuit in an off condition.

When a subscriber on a long loop goes off hook, the collector-emitter voltage of transistor 110 of regulator 70 is small, therefore, the potential at the emitter of 440 is close to −48 vdc. Transistor 440 is cut off and transistor 445 conducts, causing transistors 450 and 455 to conduct.

Conduction of transistor 445 energizes relay 410. Relay 410 energizes and closes a locking path via the emitter collector junction of transistor 160 of the supervisory circuit 26, make contact 416 of relay 410 (now closed) and lead 460, and resistors 461 and 462. This disables any switching of the loop detector caused by small loop resistance changes (microphone).

When the call is terminated and the subscriber line is in the on hook condition, battery is applied to the anode of diode 470 via lead 468 which is connected to transistor 151 (in pulse detector 80), to shut off transistor 455 and ensure that transistor 455 is cut off to keep relay 410 de-energized. Diodes 471, 472 and 473 compensate for the voltage drop across resistor 155 (in the emitter circuit of transistor 151) to diode 470. Capacitors 480 and 481 bypass the switching time of the loop and pulse detector. Contacts 416 of relay 410, on closure, activate transistor 490 in the optional power supply 488 to permit power to be applied to the VF repeater.

The voice frequency repeater or gain unit is thereby actuated to provide amplified voice transmission in both directions.

While there has been described what is at present thought to be the preferred embodiments of the invention, it is understood that modification may be made therein, and it is intended to cover in the appended claims, all such modifications which fall within the true spirit and scope of the invention.

The embodiments in which an exclusive property or privilege is claimed are defined as follows:

1. Circuit apparatus for improving both signalling and voice transmission characteristics on a two-lead line between a subscribers loop and a central office comprising a current regulating network associated with each lead of said line, means responsive to closure of said line loop for connecting each regulating network to the associated line lead, means for sensing the voltage at the output of one current regulating network from its connected line lead, means responsive to a low voltage condition sensed by said one regulating network for connecting a voice frequency repeater to said line leads, and wherein there is a normally open ringing path in parallel with a portion of said line leads, and means for closing said ringing path responsive to ringing directed toward said subscriber loop to bypass said repeater, said sensing means and said regulating networks from said line loop during the continuation of ringing.

2. Circuit apparatus as claimed in claim 1, wherein there are switching means responsive to closure of said line loop for closing said portion of said line leads to said line loop and for isolating said ring path.

3. Circuit apparatus for enhancing voice transmission and supervisory signalling from between an office and a subscriber's loop comprising, means responsive to the initiation of ringing on a call from said office to said loop for closing said direct ringing path to said subscriber's loop, means responsive to an offhook condition at said loop for terminating said ringing signals to said loop, and further means operative in response to the termination of said ringing signals for disconnecting said direct ringing path, said last mentioned means on operation closing an alternate path to said loop, means in said alternate path for providing booster battery to the loop-to-office connection and for regulating the current in said connection to predetermined levels suitable for transistor voice transmission across said connection, and further including means responsive to a polarity reversal in said loop resulting from said off hook condition for reversing the direction of current flow from said booster battery means to said loop-to-office connection.

* * * * *